(12) United States Patent
Weatherbee et al.

(10) Patent No.: US 8,060,866 B2
(45) Date of Patent: Nov. 15, 2011

(54) SYSTEMS AND METHODS FOR DEBUGGING MULTIPLE WORKFLOW INSTANCES

(75) Inventors: Paul Allan Weatherbee, Edmonton (CA); David De Benedetto, Edmonton (CA); Javan Gargus, Edmonton (CA)

(73) Assignee: GE Intelligent Platforms, Inc, Charlottesville, VA (US)

( * ) Notice: Subject to any disclaimer, the term of this patent is extended or adjusted under 35 U.S.C. 154(b) by 1031 days.

(21) Appl. No.: 11/875,617

(22) Filed: Oct. 19, 2007

(65) Prior Publication Data

US 2009/0106739 A1 Apr. 23, 2009

(51) Int. Cl.
*G06F 9/44* (2006.01)
(52) U.S. Cl. ...................................... 717/127
(58) Field of Classification Search ............ 717/127
See application file for complete search history.

(56) References Cited

U.S. PATENT DOCUMENTS

| | | | |
|---|---|---|---|
| 6,324,683 B1 * | 11/2001 | Fuh et al. | 717/124 |
| 6,378,124 B1 | 4/2002 | Bates et al. | |
| 6,587,995 B1 * | 7/2003 | Duboc et al. | 716/106 |
| 6,848,097 B1 * | 1/2005 | Alverson et al. | 717/124 |
| 7,318,172 B2 * | 1/2008 | Lou | 714/25 |
| 7,483,694 B2 * | 1/2009 | Varanda | 455/423 |
| 7,707,555 B2 * | 4/2010 | Spertus et al. | 717/127 |
| 7,779,390 B1 * | 8/2010 | Allavarpu et al. | 717/124 |
| 2002/0087949 A1 * | 7/2002 | Golender et al. | 717/124 |
| 2002/0188930 A1 * | 12/2002 | Moser et al. | 717/129 |
| 2003/0074650 A1 | 4/2003 | Akgul et al. | |
| 2007/0168997 A1 * | 7/2007 | Tran | 717/129 |
| 2009/0106739 A1 * | 4/2009 | Weatherbee et al. | 717/127 |

FOREIGN PATENT DOCUMENTS

WO 9922288 A 5/1999

OTHER PUBLICATIONS

Jonathan B Rosenberg Ed, "How Debuggers work—Chapter 2" How debuggers work. Algorithms, Data, Structures, and Architecture, New York, John Wiley & Sons, US, Jan. 1, 1996, pp. 21-37, XP00790287.
Rosenberg J B Ed—Rosenberg J B: "How Debuggers Work?, Chapter 9: Multithreaded Debugging" How debuggers work. Algorithms, Data, Structures, and Architecture, New York, John Wiley & Sons, US, Jan. 1, 1996, pp. 173-184, XP002404469.
PCT Search Report issued in connection with corresponding PCT Application No. US08/73137 on Oct. 19, 2007.

* cited by examiner

*Primary Examiner* — Wei Zhen
*Assistant Examiner* — Junchun Wu
(74) *Attorney, Agent, or Firm* — GE Global Patent Operation; Mark Conklin

(57) ABSTRACT

Systems and methods for remotely monitoring and debugging processes over a distributed network are provided. In one aspect, a method includes attaching to a first process of a plurality of processes running on a remote device such that a second process of the plurality of processes is not interrupted, and displaying details of the first process at a client.

16 Claims, 2 Drawing Sheets

SYSTEMS AND METHODS FOR DEBUGGING MULTIPLE WORKFLOW INSTANCES

BACKGROUND OF THE INVENTION

The systems and methods described herein relate generally to debugging workflow instances and, more particularly, to simultaneously monitoring and debugging multiple workflow instances throughout a distributed network.

At least some known debugging tools allow remote debugging of a running workflow instance over a network. Some such debugging tools use a graphical client interface. However, such tools require that debugging services be installed on the computer or device running the workflow instance. Moreover, when a user connects to a device in order to debug a workflow instance, all other workflow instances running on the device are stopped.

Further, for at least some known debugging tools, only one workflow instance can be debugged at a time when using a tool having a graphical client interface. Similarly, for at least some known debugging tools, only one debugging tool having a graphical client interface can be connected to a device at any one time.

BRIEF DESCRIPTION OF THE INVENTION

In one aspect, a method for monitoring processes over a network includes attaching to a first process of a plurality of processes running on a remote device such that a second process of the plurality of processes is not interrupted. The method also includes displaying details of the first process at a client.

In another aspect, a method for debugging a workflow instance includes communicating to a workflow engine a request to attach to a first workflow instance of a plurality of workflow instances such that a second workflow instance of the plurality of workflow instances is not interrupted. The method also includes communicating messages relating to the first workflow instance to at least one client, the messages including at least one of a breakpoint status and a workflow instance status.

In another aspect, a system for monitoring and debugging a plurality of processes over a network is provided. The system includes at least one client communicatively coupled to the network and at least one server including a workflow service provider and a workflow engine. The at least one server is communicatively coupled to the network. The system also includes at least one device communicatively coupled to the network and configured to run a plurality of processes. The workflow engine is configured to monitor a first process of the plurality of processes such that a second process of the plurality of processes is not interrupted. The at least one client is configured to display details of the first process, wherein the details include at least one of an alert raised when the first process has communicated data to the second process, an alert raised when the first process encounters a fault, and an alert raised when the first process is completed.

BRIEF DESCRIPTION OF THE DRAWINGS

FIG. 1 is a schematic diagram of an exemplary remote debugging system; and

FIG. 2 is a flow chart illustrating an exemplary method for debugging a workflow instance using the debugging system shown in FIG. 1.

DETAILED DESCRIPTION OF THE INVENTION

Set forth below are descriptions of exemplary systems and methods for use in debugging and monitoring running workflow instances in an automation system, and which provide a number of technical effects. One such technical effect is to provide systems and methods that enable one or more clients to simultaneously debug multiple workflow instances throughout a distributed network without impacting other running workflow instances.

As used herein, the term "workflow instance" refers to a process or program that is executed or run. A workflow instance is run on a device, such as a computer or automation controller, electrically coupled to a network.

Figure 1:
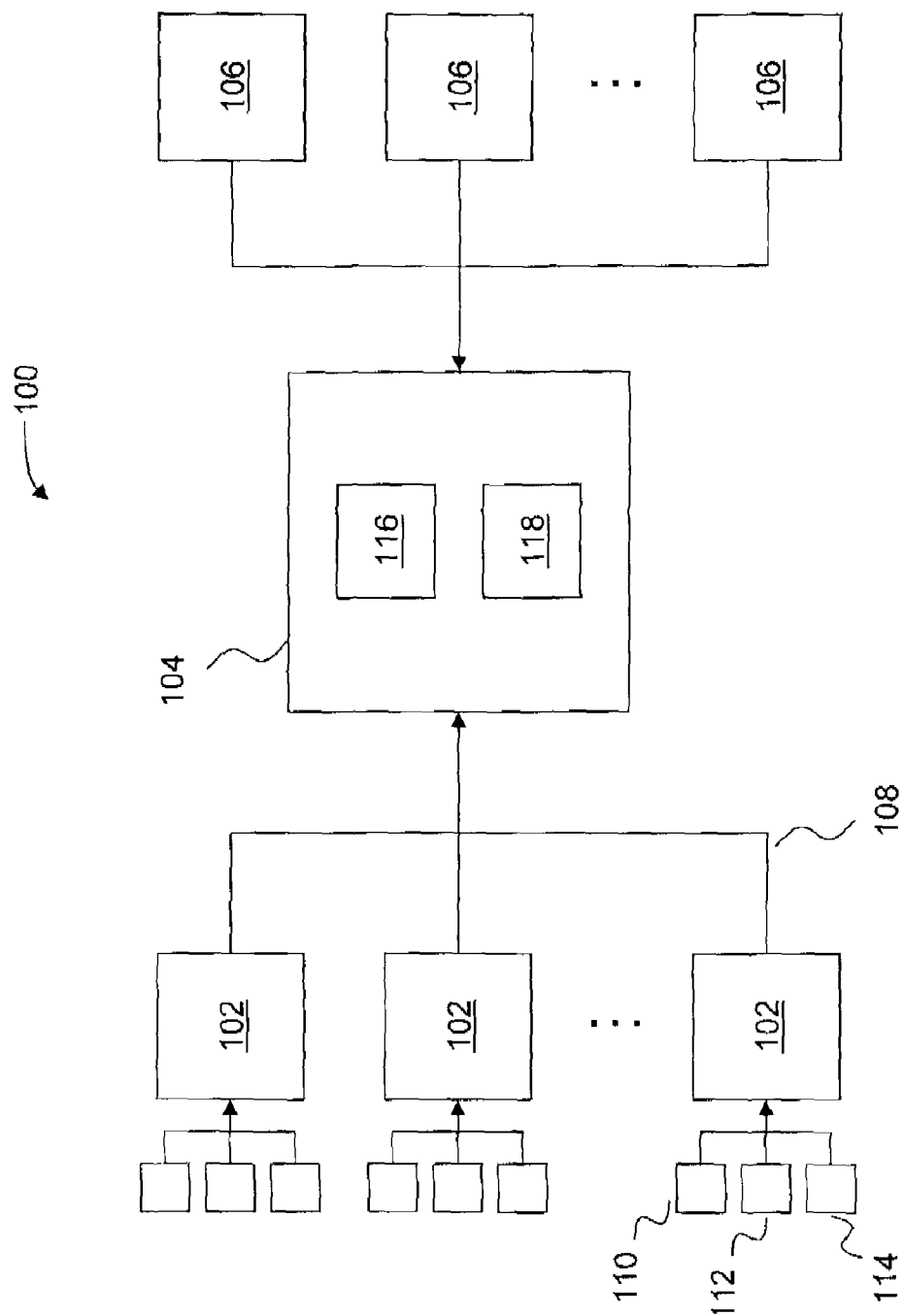
FIGS. 1 and 2 show exemplary embodiments of the systems and methods described herein. The systems and methods shown in FIGS. 1 and 2 and described in conjunction with FIGS. 1 and 2 are exemplary only.

FIG. 1 is a schematic diagram of an exemplary workflow instance debugging system 100. In the exemplary embodiment, system 100 includes at least one client 102, at least one server 104, and at least one remote device 106. System 100 is interconnected by a network 108. In one embodiment, network 108 is a wide area network (WAN), such as the Internet. In an alternative embodiment, network 108 is a local area network (LAN), such as an intranet. Network 108 includes the physical medium and intermediate devices (not shown), such as routers and switches, that connect the elements of system 100 described above.

In the exemplary embodiment, client 102 is communicatively connected to network 108 via a network interface (not shown). A user accesses, such as dialing into, or directly logging into, an intranet or the Internet to gain access to system 100. Client 102 may connect to network 108 through any suitable interface including a different network (not shown), such as a WAN or a LAN, dial in connections, cable modems, wireless networks, and special high-speed ISDN lines. Client 102 includes any suitable device capable of interconnecting to network 108, including, without limitation, a web-based telephone or other web-based connectable equipment. Client 102 may be a stand-alone client, such as a thin client, that runs only an operating system and an application for accessing and communicating with system 100. Alternatively, client 102 may operate as an application installed on a personal computer (PC) and may run similarly and/or concurrently with other programs. Client 102 also includes a system memory (not shown) electrically connected to a system bus (not shown) and, in one embodiment, includes an operating system and a user-oriented program and data. Client 102 also includes user interaction devices such as a display 110, a keyboard 112, and a mouse 114.

Server 104 is communicatively coupled to network 108 via a network interface (not shown). Server 104 includes a system memory (not shown) electrically connected to a system bus (not shown) and, in one embodiment, includes an operating system. In the exemplary embodiment, server 104 includes a workflow service provider 116. Server 104 also includes at least one processor (not shown) which supports enumeration of running service providers, such as service provider 116. Additionally, server 104 includes a workflow engine 118. In the exemplary embodiment, server 104 hosts both workflow service provider 116 and workflow engine 118. In an alternative embodiment, system 100 includes more than one server 104 such that a first server hosts workflow service provider 116 and a second server hosts workflow engine 118. In a further alternative embodiment, server 104 is configured as a collection of multiple servers in a clustered or replicated environment.

System 100 also includes at least one remote device 106. Each remote device 106 may be an automation system device such as, but not limited to, a manufacturing machine and/or a data sensor. Alternatively, each remote device 106 may be a computer operatively coupled to an automation system device.

During operation, client 102 transmits debugging commands to server 104 via network 108. More specifically, client 102 transmits debugging commands to workflow service provider 116, which, in turn, transmits the commands to workflow engine 118. The debugging commands may include commands including, but not limited to only including, a debug initialization command and/or a debug release command. Workflow service provider 116 tracks an identifier for client 102 that requests workflow engine 118 to attach to a running workflow instance for debugging purposes. Workflow service provider 116 also tracks an identifier for the workflow instance being debugged. Workflow service provider 116 thus manages debugging sessions using such identifiers. For example, the workflow service provider tracks a first workflow instance running on a device and being debugged by a first client, while also tracking a second workflow instance running on the device and being debugged by a second client. Accordingly, workflow service provider 116 enables multiple clients 102 to debug workflow instances running on the same device 106. Similarly, workflow service provider 116 enables multiple clients 102 to debug the same workflow instance running on a device. As an example, the workflow service provider tracks a workflow instance running on a device and being debugged by both a first client and a second client simultaneously. Moreover, workflow service provider 116 enables multiple clients 102 to debug multiple workflow instances running on multiple devices 106.

Workflow engine 118, in response to a debug request transmitted by client 102 to workflow service provider 116, attaches to the requested workflow instance. Workflow engine 118 then transmits messages relating to the workflow instance to workflow service provider 116, which, in turn, transmits the messages to client 102. The messages include, but are not limited to, notification that a workflow instance that was waiting on external data has received the data, notification that a fault has occurred, and/or notification that the workflow instance being debugged has finished. The messages are received and displayed by client 102 using display 110.

Client 102 also manages the addition and deletion of breakpoints within a workflow instance being debugged. A breakpoint is a defined point within a workflow instance when a predetermined action occurs and/or when a value is set to a predetermined value or within a predetermined value range. When a debugging session is initiated, client 102 transmits a list of currently defined breakpoints for that particular workflow instance, if any. Client 102 enables a user to add new breakpoints while a debugging session is running. Further, client 102 enables a user to remove breakpoints from a running debugging session. When a breakpoint is encountered, workflow engine 118 pauses the workflow instance and waits for a command from client 102. In one embodiment, client 102 instructs workflow engine 118 to continue the workflow instance from the encountered breakpoint or stop the workflow instance. In an alternative embodiment, client 102 can also instruct workflow engine 118 to continue the workflow instance from a point within the workflow instance different than the encountered breakpoint. In a further alternative embodiment, client 102 can also instruct workflow engine 118 to switch to executing a different workflow instance. In a further alternative embodiment, client 102 can dynamically modify the flow control logic of the workflow instance. For example, client 102 can modify a "while" loop within the workflow instance logic such that the workflow instance functions differently with respect to the modified flow control logic.

Additionally, client 102 can request a modification of a value of a workflow instance variable of a workflow instance being debugged. Client 102 transmits the request to workflow service provider 116, which, in turn, transmits the request to workflow engine 118. Workflow engine 118 attempts to modify the variable value and transmits a response indicating whether the value was successfully modified.

Figure 2:
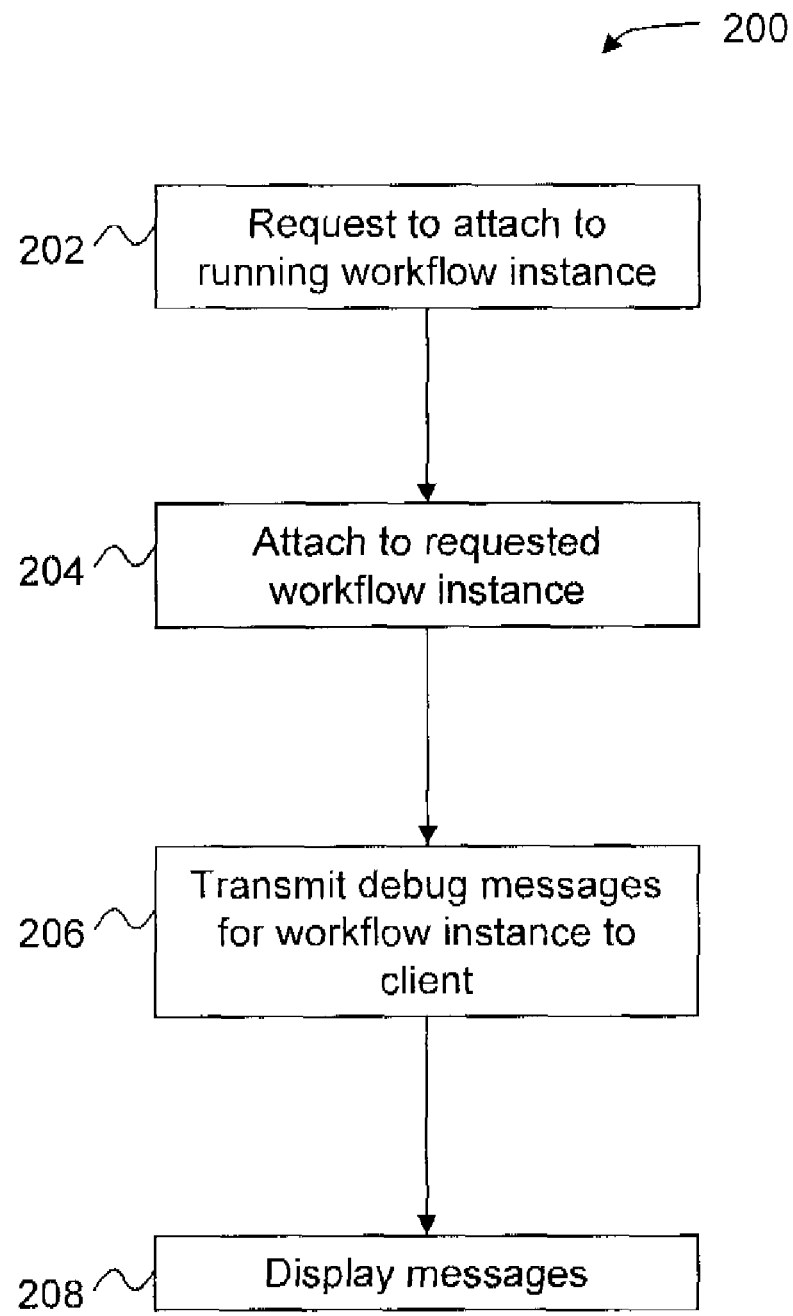

FIG. 2 is a flow chart illustrating an exemplary method 200 for debugging a workflow instance using system 100 (shown in FIG. 1). In the exemplary embodiment, client 102 (shown in FIG. 1) communicates 202 a request to server 104 (shown in FIG. 1) via network 108 (shown in FIG. 1). More specifically, client 102 communicates 202 a request for debugging to workflow service provider 116 (shown in FIG. 1). Workflow service provider 116 then communicates the request to workflow engine 118 (shown in FIG. 1).

Moreover, in the exemplary embodiment, workflow engine 118, in response to the debug request transmitted by client 102 to workflow service provider 116, attaches 204 to the requested workflow instance running on device 106 (shown in FIG. 1). Workflow engine 118 then transmits 206 messages relating to the workflow instance to workflow service provider 116, which, in turn, transmits the messages to client 102. The messages include, but are not limited to, notification that a workflow instance that was waiting on external data has received the data, notification that a fault occurs, and/or notification that the workflow instance being debugged has finished. The messages are received and displayed 208 by client 102 using display 110 (shown in FIG. 1).

In an alternative embodiment, when a debugging session is initiated, client 102 transmits a list of currently defined breakpoints for that particular workflow instance, if any. More specifically, client 102 transmits the list of currently defined breakpoints to workflow service provider 116. Client 102 enables a user to add new breakpoints while a debugging session is running. Further, client 102 enables a user to remove breakpoints from a running debugging session. When a breakpoint is encountered, workflow engine 118 pauses the workflow instance and waits for a command from client 102. In one embodiment, client 102 instructs workflow engine 118 to continue the workflow instance from the encountered breakpoint or stop the workflow instance. In an alternative embodiment, client 102 can also instruct workflow engine 118 to continue the workflow instance from a point within the workflow instance different than the encountered breakpoint. In a further alternative embodiment, client 102 can also instruct workflow engine 118 to switch to executing a different workflow instance. In a further alternative embodiment, client 102 can dynamically modify the flow control logic of the workflow instance.

In a further alternative embodiment, client 102 requests a modification of a value of a workflow instance variable of a workflow instance being debugged. Client 102 transmits the request to workflow service provider 116, which, in turn, transmits the request to workflow engine 118. Workflow engine 118 attempts to modify the variable value and transmits a response indicating whether the value was successfully modified.

The above-described systems and methods facilitate remotely debugging a running workflow instance without interrupting other workflow instances running on the same device. Moreover, enabling a user to remotely debug a workflow instance facilitates the user to provide offsite help without a need to add extra debugging software on the remote device. Further, the systems and methods described above facilitate simultaneously debugging multiple workflow instances running on the same device, whether debugging from one client or multiple clients.

In summary, in one embodiment, a method for monitoring processes over a network is provided. The method includes attaching to a first process of a plurality of processes running on a remote device such that a second process of the plurality of processes is not interrupted. In a particular embodiment, attaching to a first process includes communicating debugging commands from the client to a workflow engine. The workflow engine attaches to the first process in response to the client commands. In a further embodiment, attaching to a first process includes communicating debugging commands from a plurality of clients to a workflow engine, the commands relating to multiple processes. The workflow engine attaches to the process requested by each client.

Moreover, in one embodiment, the method also includes defining at least one breakpoint within the first process and communicating the at least one breakpoint to the workflow engine. In an alternative embodiment, the method includes communicating to the workflow engine a client request to modify a process variable value and communicating a response from the workflow engine regarding if the variable value modification was successful.

Further, in one embodiment, the method also includes displaying details of the first process at a client. In a further embodiment, displaying details of the first process includes communicating to the client messages relating to the first process. The messages include process variable values, a breakpoint status, an alert that the first process has communicated data to the second process, a fault alert, and/or a process completion alert. In a further embodiment, and where a breakpoint has been encountered by the first process, displaying details of the first process includes displaying a set of options including stopping the first process, continuing the first process from the breakpoint, jumping to the second process, jumping to a different location within the first process, and/or modifying the flow control logic of the first process.

As used herein, an element or step recited in the singular and proceeded with the word "a" or "an" should be understood as not excluding a plurality of said elements or steps, unless such exclusion is explicitly recited. Further, references to one embodiment of the present invention are not intended to be interpreted as excluding the existence of additional embodiments that also incorporate the recited features.

Exemplary embodiments of systems and methods for enabling remotely debugging and/or monitoring one or more running workflow instances are described above in detail. The systems and methods are not limited to the specific embodiments described herein, but rather, components of the systems and/or steps of the methods may be utilized independently and separately from other components and/or steps described herein. Further, the described system components and/or method steps can also be defined in, or used in combination with, other systems and/or methods, and are not limited to practice with only the systems and methods as described herein.

While the systems and methods have been described in terms of various specific embodiments, those skilled in the art will recognize that the systems and methods can be practiced with modification within the spirit and scope of the claims.

What is claimed is:

1. A method for monitoring processes over a network, said method comprising:
   attaching to a first process of a plurality of processes running on a remote device such that a second process of the plurality of processes is not interrupted;
   running the first and second processes simultaneously on the remote device such that the first process does not affect the second process and the second process does not affect the first process, wherein the first and second processes are debugging commands that do not modify the processes;
   defining at least one breakpoint within the first process, wherein the at least one breakpoint has been encountered by the first process;
   communicating the at least one breakpoint to the workflow engine; and displaying details of the first process at a client, wherein the details are a set of options including at least one of stopping the first process, continuing the first process from the breakpoint, jumping to the second process, jumping to a different location within the first process, and modifying the flow control logic of the first process.

2. A method in accordance with claim 1 wherein attaching to a first process comprises communicating debugging commands from the client to a workflow engine, the workflow engine attaching to the first process in response to the client commands.

3. A method in accordance with claim 1 wherein attaching to a first process comprises communicating debugging commands from a plurality of clients to a workflow engine, the debugging commands relating to multiple processes of the plurality of processes, the workflow engine attaching to a process requested by each client.

4. A method in accordance with claim 1 wherein displaying details of the first process comprises communicating to the client messages relating to the first process, the messages including at least one of process variable values, a breakpoint status, an alert that the first process has communicated data to the second process, a fault alert, and a process completion alert.

5. A method in accordance with claim 1 further comprising:
   communicating to the workflow engine a client request to modify a process variable value; and
   communicating a response from the workflow engine indicating whether the variable value modification was successful.

6. A method for debugging a workflow instance, executable by a processor, said method comprising:
   communicating to a workflow engine a request to attach a debugging command to a first workflow instance of a plurality of workflow instances such that a second workflow instance of the plurality of workflow instances is not interrupted, wherein the debugging command does not modify the workflow instance; and
   running the first and second workflow instance simultaneously such that the first process does not affect the second process and the second process does not affect the first process, wherein the first and second processes are debugging commands;
   defining at least one breakpoint within the first workflow instance, wherein the at least one breakpoint has been encountered by the first process; and communicating messages relating to the first workflow instance to at least one client using the processor, the messages including at least one of a breakpoint status and a workflow instance status, displaying details of the first process at a client, wherein the details are a set of options including at least one of stopping the first process, continuing the first process from the breakpoint, jumping to the second process, jumping to a different location within the first process, and modifying the flow control logic of the first process.

7. A method in accordance with claim 6 wherein communicating to a workflow engine a request to attach to a first workflow instance comprises:

communicating the request from the at least one client to a workflow service provider;

communicating the request from the workflow service provider to the workflow engine; and attaching to the first workflow instance, the attachment made by the workflow engine in response to the request.

8. A method in accordance with claim 6 further comprising removing an existing breakpoint relating to the first workflow instance.

9. A method in accordance with claim 6 wherein communicating messages relating to the first workflow instance comprises communicating messages to the at least one client, the messages including at least one of an alert raised when the first workflow instance has communicated data to the second workflow instance, an alert raised when the first workflow instance encounters a fault, and an alert raised when the first workflow instance is completed.

10. A method in accordance with claim 6 further comprising:

communicating to the workflow engine a request to modify a variable value of the first workflow instance; and communicating to the at least one client a response indicating whether the variable value is successfully modified.

11. A system for monitoring and debugging a plurality of processes, executable by a processor over a network, said system comprising:

at least one client communicatively coupled to said network;

at least one server comprising a workflow service provider and a workflow engine, said at least one server communicatively coupled to said network; and at least one device communicatively coupled to said network, said at least one device configured to run a plurality of processes simultaneously such that a first process does not affect a second process and the second process does not affect the first process, said workflow engine configured to monitor the first process of the plurality of processes such that the second process of the plurality of processes is not interrupted, attaching to a first process of a plurality of processes running on a remote device such that a second process of the plurality of processes is not interrupted, wherein the first and second processes are debugging commands that do not modify the processes, the device further configured to define at least one breakpoint within the first process, wherein the at least one breakpoint has been encountered by the first process;

said at least one client configured to display details of the first process, wherein the details are a set of options including at least one of stopping the first process, continuing the first process from the breakpoint, jumping to the second process, jumping to a different location within the first process, modifying the flow control logic of the first process, an alert raised when the first process has communicated data to the second process, an alert raised when the first process encounters a fault, and an alert raised when the first process is completed.

12. A system in accordance with claim 11 wherein said workflow service provider is configured to:

receive a request from said at least one client to monitor the first process;

communicate the request to said workflow engine, said workflow engine monitors the first process in response to the request;

receive the details of the first process monitored by said workflow engine; and communicate the details to said at least one client.

13. A system in accordance with claim 12 wherein said workflow service provider is further configured to:

track an identifier of said at least one client having made the request; and track an identifier of the first process being monitored.

14. A system in accordance with claim 11 wherein said at least one client is further configured to:

remove an existing breakpoint within the first process.

15. A system in accordance with claim 14 wherein said workflow engine is further configured to pause the first process when a breakpoint is encountered.

16. A system in accordance with claim 11 wherein said workflow service provider is configured to:

communicate to said workflow engine a request by said at least one client to modify a variable value of the first process; and communicate to said at least one client a response indicating whether the variable value is successfully modified.

\* \* \* \* \*